(12) United States Patent
Wang (10) Patent No.: US 8,121,178 B2
(45) Date of Patent: Feb. 21, 2012

(54) METHOD AND SYSTEM FOR SENDING DATA USING A VERY HIGH BIT RATE DIGITAL SUBSCRIBER LINE

(75) Inventor: Jin Wang, Union City, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 803 days.

(21) Appl. No.: 11/529,782

(22) Filed: Sep. 28, 2006

(65) Prior Publication Data
US 2008/0080595 A1    Apr. 3, 2008

(51) Int. Cl.
H04L 25/20    (2006.01)
H04B 1/38     (2006.01)

(52) U.S. Cl. ......................... 375/211; 375/222

(58) Field of Classification Search .................. 375/211, 375/222, 316, 295, 257, 219, 377, 213; 455/7, 455/9, 10; 370/276, 293, 225, 226; 379/4, 379/93.01, 236–239; 398/9–11, 17, 18, 37
See application file for complete search history.

(56) References Cited

U.S. PATENT DOCUMENTS

| | | | |
|---|---|---|---|
| 4,242,542 A * | 12/1980 | Kimbrough | 370/293 |
| 4,277,655 A * | 7/1981 | Surprenant | 379/340 |
| 4,282,407 A * | 8/1981 | Stiefel | 379/377 |
| 4,392,225 A * | 7/1983 | Wortman | 370/492 |
| 4,396,808 A | 8/1983 | Vincent | |
| 5,774,316 A * | 6/1998 | McGary et al. | 361/42 |
| 6,175,556 B1 * | 1/2001 | Allen et al. | 370/293 |
| 6,535,983 B1 * | 3/2003 | McCormack et al. | 713/310 |
| 6,658,049 B1 * | 12/2003 | McGhee et al. | 375/211 |
| 6,665,404 B2 * | 12/2003 | Cohen | 379/413 |
| 6,924,566 B2 * | 8/2005 | Robinson et al. | 307/38 |
| 6,977,958 B1 * | 12/2005 | Hinman et al. | 375/211 |
| 7,190,716 B2 * | 3/2007 | Norrell et al. | 375/222 |
| 7,194,023 B2 * | 3/2007 | Norrell et al. | 375/222 |
| 7,209,654 B2 * | 4/2007 | Tanaka et al. | 398/29 |
| 7,317,874 B2 * | 1/2008 | Li et al. | 398/72 |
| 2002/0106012 A1 * | 8/2002 | Norrell et al. | 375/222 |
| 2002/0106013 A1 * | 8/2002 | Norrell et al. | 375/222 |
| 2002/0106076 A1 * | 8/2002 | Norrell et al. | 379/399.01 |
| 2002/0141569 A1 * | 10/2002 | Norrell et al. | 379/377 |
| 2003/0030327 A1 * | 2/2003 | Robinson et al. | 307/31 |
| 2003/0117173 A1 * | 6/2003 | Morgan | 326/86 |
| 2003/0202655 A1 * | 10/2003 | Nattkemper et al. | 379/413 |

(Continued)

FOREIGN PATENT DOCUMENTS
WO    WO 2006/060754 A2    6/2006

*Primary Examiner* — Tesfaldet Bocure
(74) *Attorney, Agent, or Firm* — G. Michael Roebuck (57) ABSTRACT

In a particular embodiment a VDSL repeater is disclosed. The VDSL repeater includes a first interface for receiving data from an IPTV network node; a second interface for sending data to an end user client device; and an amplifier in electrical communication with the first interface for amplifying data received on the first interface from the IPTV network node when a power supply voltage is present on the first interface, wherein the amplifier sends the amplified data received on the first interface to the second interface. In another aspect of a particular embodiment the VDSL repeater further includes a circuit that bypasses the amplifier when the power supply voltage is not present on the first interface. In another particular embodiment a method for amplifying a VDSL signal when a power supply voltage is present on the twisted pair using the power supply voltage is disclosed.

23 Claims, 6 Drawing Sheets

U.S. PATENT DOCUMENTS

| | | | |
|---|---|---|---|
| 2005/0232030 A1* | 10/2005 | Mawatari et al. | 365/189.05 |
| 2006/0039550 A1* | 2/2006 | Chadha et al. | 379/406.09 |
| 2006/0082220 A1* | 4/2006 | Karam et al. | 307/4 |
| 2006/0129863 A1* | 6/2006 | Kouropoulos et al. | 713/340 |
| 2006/0239183 A1* | 10/2006 | Robitaille et al. | 370/217 |
| 2007/0058976 A1* | 3/2007 | Tatum et al. | 398/99 |
| 2007/0217101 A1* | 9/2007 | Carter et al. | 361/54 |
| 2007/0286207 A1* | 12/2007 | Almalki et al. | 370/395.52 |
| 2008/0016540 A1* | 1/2008 | Savoor et al. | 725/112 |
| 2008/0056284 A1* | 3/2008 | Powell et al. | 370/401 |
| 2008/0080595 A1* | 4/2008 | Wang | 375/211 |
| 2008/0219419 A1* | 9/2008 | Wiggers | 379/93.08 |

* cited by examiner

METHOD AND SYSTEM FOR SENDING DATA USING A VERY HIGH BIT RATE DIGITAL SUBSCRIBER LINE

FIELD OF THE DISCLOSURE

The present disclosure relates generally to a sending internet protocol television data over digital subscriber line.

BACKGROUND

One method of accessing the Internet is by using digital subscriber line (DSL) technology, which has several varieties, including asymmetric DSL (ADSL) and very high bit rate DSL (VDSL) versions. ADSL is one version of DSL technology that expands the useable bandwidth of existing copper telephone lines. ADSL is "asymmetric" in that ADSL reserves more bandwidth in one direction than in the other, which may be beneficial for users who do not require equal bandwidth in both directions. In one implementation, ADSL signals generally occupy the frequency band between about 25 kHz and 1.104 MHz. In this configuration, ADSL uses the frequency band between about 25 kHz and 120 kHz to transmit upstream signals (signals from a customer premises to a central office) and the frequency band between about 150 kHz to 1.104 MHz to transmit downstream signals (signals from the central office to a customer premises).

ADSL employs Frequency Division Multiplexing (FDM) to separate upstream and downstream signals and to separate ADSL signals from POTS (Plain Old Telephone Service) band signals, which reside below 4 kHz. VDSL also uses FDM to separate downstream and upstream channels as well as to separate both downstream and upstream channels from POTS signals.

DSL signals generally degrade as they traverse the local loop. Hence, the longer the local loop length, the more degraded the DSL signal will tend to be upon arriving at a central office or a customer premises. DSL signal degradation over a local loop may be caused, for example, by factors such as: signal attenuation, crosstalk, thermal noise, impulse noise, and ingress noise from commercial radio transmitters. The dominant impairment, however, is often signal attenuation. For example, a transmitted VDSL signal can suffer as much as 60 dB or more of attenuation on long loops, which substantially reduces the useable signal, greatly reducing potential data rates.

DETAILED DESCRIPTION

In a particular embodiment of the present invention a method for sending a video signal, which can be an internet protocol television (IPTV) video signal, over a very high bit rate digital service line (VDSL) signal is disclosed. The method includes receiving the VDSL signal on a twisted pair from an IPTV network node; sensing when a power supply voltage is present with the VDSL signal on the twisted pair; and amplifying the VDSL signal using the power supply voltage when the power supply voltage is present with the VDSL signal on the twisted pair. In another aspect of a particular embodiment the method further includes sending the amplified VDSL signal to an end user client device when the power supply voltage is present with the VDSL signal on the twisted pair. In another aspect of a particular embodiment the method further includes passing the VDSL signal unaltered to an end user client device when the power supply voltage is not present with the VDSL signal on the twisted pair. In another aspect of a particular embodiment the method further includes receiving an end user signal from an end user client device; amplifying the end user signal using the power supply voltage and sending the amplified end user signal to an IPTV network node when the power supply voltage is present with the VDSL signal on the twisted pair; and passing the end user signal to the IPTV network node unaltered when the power supply voltage is not present with the VDSL signal on the twisted pair. In another aspect of a particular embodiment the twisted pair is less than 2,500 feet long. In another aspect of a particular embodiment wherein the VDSL signal is at least 30 Megabits per second. In another aspect of a particular embodiment the power supply voltage is −48 volts. In another aspect of a particular embodiment wherein the IPTV network node receives the IPTV signal over an optical fiber from a central office in an IPTV network. In another aspect of a particular embodiment the IPTV network node is a service area interface and/or a digital subscriber line aggregator multilayer.

In another particular embodiment a computer readable medium containing a computer program for sending an internet protocol television (IPTV) very high bit rate digital service line (VDSL) signal is disclosed. The computer program includes instructions to receive the VDSL signal on a twisted pair from an IPTV network node; instructions to sense when a power supply voltage is present on the twisted pair with the VDSL signal on the twisted pair; and instructions to amplify the VDSL signal using the power supply voltage when the power supply voltage is present with the VDSL signal on the twisted pair. In another aspect of a particular embodiment the computer program further includes instructions to send the amplified VDSL signal to an end user client device when the power supply voltage is present on the twisted pair. In another aspect of a particular embodiment the computer program further includes instructions to pass the VDSL signal unaltered to an end user client device when the power supply voltage is not present with the VDSL signal on the twisted pair. In another aspect of a particular embodiment the computer program further includes instructions to receive an end user signal from the end user client device; instructions to amplify the end user signal using the power supply voltage and sending the amplified end user signal to an IPTV network node when the power supply voltage is present; and instructions to pass the end user signal to the IPTV network node unaltered when the power supply voltage is not present.

In another particular embodiment a VDSL repeater is disclosed. The VDSL repeater includes a first interface for receiving data from an IPTV network node; a second interface for sending data to an end user client device; and an amplifier in electrical communication with the first interface for amplifying data received on the first interface from the IPTV node when a power supply voltage is present on the first interface, wherein the amplifier sends the amplified data received on the first interface to the second interface. In another aspect of a particular embodiment the VDSL repeater further includes a circuit that bypasses the amplifier when the power supply voltage is not present on the first interface. In another aspect of a particular embodiment the first interface is also for sending data to the IPTV node and the second interface is also for receiving data from the end user client device. The VDSL repeater further includes a first hybrid circuit positioned between the first interface and the amplifier that connects down stream data from the first interface to a down stream amplifier and a second hybrid circuit positioned between the second interface and the amplifier that connects upstream data received on the second interface to an upstream amplifier, wherein the amplified upstream data is sent to the first interface and the amplified downstream data is sent to the second interface. In another aspect of a particular embodiment the VDSL down stream data is at least 30 Mega bits per second.

In another particular embodiment a system for distributing IPTV data from an IPTV network is disclosed. The system includes an IPTV network node in the IPTV network; a first interface in data communication with a twisted pair from the IPTV network node; a second interface in data communication with an end user client device; and an amplifier in electrical communication with the first interface that amplifies data received on the first interface from the IPTV node when a power supply voltage is present on the twisted pair with data, wherein the amplifier sends the amplified data received on the first interface to the second interface. In another aspect of a particular embodiment the system further includes a bypass circuit that directly connects the first interface to the second interface and bypasses the amplifier when the power supply voltage is not present on the twisted pair. In another aspect of a particular embodiment the first interface sends data to the IPTV node and receives data from the end user client device the second interface. The VDSL further includes a first hybrid circuit positioned between the first interface and the amplifier that connects down stream data from the first interface to a down stream amplifier and a second hybrid circuit positioned between the second interface and the amplifier that connects upstream data from the end user client device to an upstream amplifier, wherein the amplified upstream data is sent to the IPTV node and the amplified downstream data is sent to the end user client device. In another aspect of a particular embodiment wherein the VDSL down stream data is at least 30 Mega bits per second.

In another particular embodiment a method for amplifying an internet protocol television (IPTV) very high bit rate digital service line (VDSL) signal is disclosed. The method includes receiving the VDSL signal on a twisted pair; sensing when a power supply voltage is present with the VDSL signal on the twisted pair; and amplifying the VDSL signal using the power supply voltage. In another aspect of a particular embodiment the method further includes sending the amplified VDSL signal when the power supply voltage is present with the VDSL signal on the twisted pair. In another aspect of a particular embodiment the method further includes passing the VDSL signal unaltered when the power supply voltage is not present with the VDSL signal on the twisted pair. In another aspect of a particular embodiment the method further includes receiving an end user signal; amplifying the end user signal using the power supply voltage and sending the amplified end user signal when the power supply voltage is present with the VDSL signal on the twisted pair; and passing the end user signal unaltered when the power supply voltage is not present with the VDSL signal on the twisted pair.

An illustrative embodiment of a VDSL repeater is disclosed that substantially increases very high bit rate digital subscriber line (VDSL) rate and extends VDSL reach in an internet protocol television system. Some past VDSL technology was able to deliver a bandwidth of approximately 20 Mbits/second (Mbps) downstream and 1 Mbps upstream at a distance of about 4000 ft. In an illustrative embodiment, with the aid of the VDSL repeater, VDSL rates are enhanced to 30 Mbps downstream and 3 Mbps upstream at a distance of up to 5000 ft and more.

In an illustrative embodiment, a practical and forward-compatible VDSL repeater is described in detail. An illustrative embodiment does not use a central office (CO) provided power supply or local power supply to power up an xDSL (DSL, ADSL, VDSL) repeater amplifier. In an illustrative embodiment, a VDSL signal is used to carry a video signal which may be an IPTV signal. Moreover, it may not be practical to use CO provided power supply because the distance from CO to repeater is typically too great, usually greater than 10 Kft so that all the power will be consumed by the telephone cable resistive losses and insufficient voltage reaches the repeater to power an amplifier. Moreover, local power may not be a feasible solution for residential VDSL customers as the reliability of local power may not meet the requirements of telecom usage. Moreover, the location of a locally powered repeater would be limited to those places where local power is available.

In an illustrative embodiment, the VDSL loop is often much shorter than other xDSL loops (0-5 Kft versus 0-16 Kft). Moreover, an internet protocol television network node where VDSL digital subscriber line access multiplexer (DSLAM) exists or a nearby service area interface (SAI) is located is invariably provided with DC power of −48 Volts. Any power supply voltage available at the IPTV network node and capable of delivering enough power (approximately 2 watts in an illustrative embodiment) to power an amplifier is suitable.

Hence, in an illustrative embodiment, a −48 V power is provided along with a VDSL signal to the VDSL repeater from a DSLAM through a twisted pair referred to as a "VDSL loop". The DSLAM and adjacent service area interface (SAI) is in data communication with an IPTV network server node and serves as an IPTV network node (also referred to herein as a "node") in the IPTV network. The VDSL loop carries an IPTV video data signal which may also include voice over internet protocol (VoIP) data, regular Internet data and a −48 V power voltage concurrently, when the −48 V is present. If it is assumed the illustrative VDSL repeater amplifier is 2.5 Kft away from the node, a 48V power supply at an SAI adjacent the IPTV node DSLAM can easily provide 12V DC at 150 milliamps to the illustrative VDSL repeater amplifier. In an illustrative embodiment, 12V DC at 150 mA provides approximately 2 Watts of power, which is sufficient for amplifying and retransmitting an incoming downstream VDSL signal at an illustrative repeater amplifier. Moreover, the reliability of an IPTV network node power supply provides telecommunication grade reliability.

In fiber to the node (FTTN) IPTV networks, the node is often a DSLAM or an adjacent serving area interface (SAI) so the terms "node" and "DSLAM" or "SAI" are used interchangeably hereafter. In addition, in a particular embodiment, an illustrative VDSL repeater has not only the repeater (signal amplification) mode but also a "bypass" (no signal amplification) mode, so that an illustrative VDSL repeater can be easily bypassed when desired. The bypass mode helps to make the illustrative VDSL repeater forward compatible as it can be easily removed electrically from a VDSL loop by removing the −48 V power supply voltage from the VDSL loop. If the −48 V DC power supply is disconnected from the VDSL loop between the IPTV network node and the repeater, the repeater will enter this "bypass" mode in which any signal on the VDSL loop will pass through the illustrative VDSL repeater without amplification or alteration.

In other words, an illustrative VDSL repeater will become transparent to signals on the loop between the IPTV network node and the VDSL repeater when the −48 V power is not provided on the VDSL loop to the illustrative VDSL repeater. Thus, an illustrative VDSL repeater can be easily disabled or bypassed on occasions when a non-VDSL service is to be provided on the VDSL loop between the IPTV node and the repeater or technicians want to test the VDSL loop (also referred to herein as "twisted pair") use existing tools such as MLT, SideKick, TDR or DSL testers. These tools may report errors if there is a working VDSL repeater in the VDSL twisted pair (loop), thus to avoid such errors an illustrative repeater can be placed in bypass mode.

This bypass mode is highly desired for any electrical device deployed in outside plant, that is, outside of the central office which is part of the IPTV network. Without the bypass feature, an illustrative VDSL repeater device may enhance the performance of current VDSL technology, but once the VDSL technology advances or changes; it may result in unintended difficulties by interfering with other signals on the loop. One example is the Metallic Test Unit (MTU), which can be installed at the end of telephone loop to facilitate the automatic test of telephone service. However, when telephone loop is used for xDSL (DSL, ADSL, VDSL, etc.) service, the MTU causes a high loss to an xDSL signal and adversely impacts the xDSL transmission rate. As MTUs can not be turned off, technicians have to take great efforts to locate the MTUs and take them off the xDSL pairs. Therefore, the easily removable bypass mode provided in an illustrative embodiment makes the illustrative VDSL repeater easy to remove from a DSL line and avoids the difficulty encountered with MTUs.

Very high bit rate digital subscriber line ("VDSL") technique is the presently among the highest speed DSL, with asymmetric rates up to 50 Mbps downstream and 30 Mbps upstream on short loops of 1000 feet. Higher rates are targeted for future developments in VDSL and xDSL development. As an evolutionary successor to the earlier asymmetrical digital subscriber Line (ADSL) technique, VDSL increases data rates by almost an order of magnitude to support an ever-increasing customer demand for IPTV network bandwidth to accommodate faster transmission of all types of information including voice, data and IPTV video, i.e., the "triple-play". Thus, a particular illustrative embodiment increases bandwidth and speed for down stream and upstream data for triple-play networks including IPTV networks, VoIP networks and internet data networks whether these networks are separated or combined into a single triple-play network.

Figure 1:
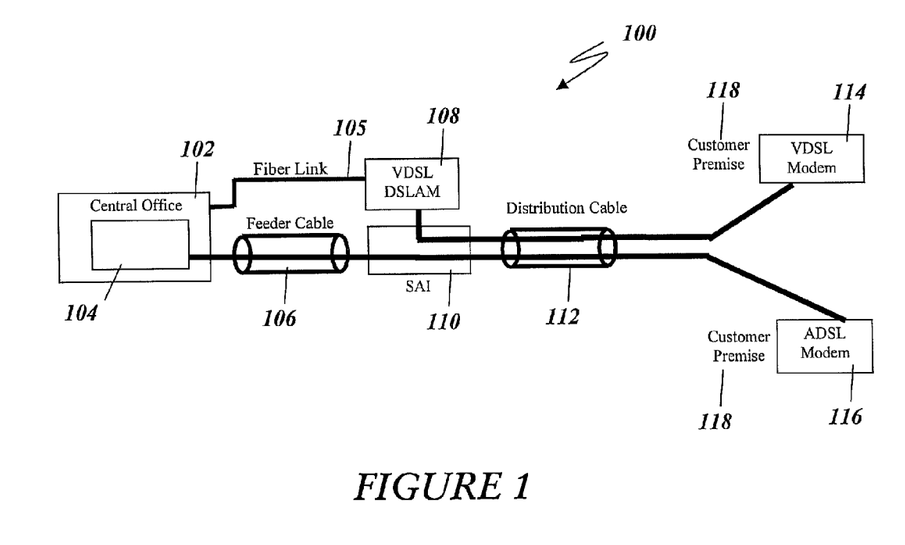
FIG. 1 depicts an illustrative embodiment of a central office sending data to an end user client device location.

VDSL provides a very high bit rate by employing a much wider frequency band (25 kHz-30 MHz) than ADSL (25 kHz-1.1 MHz). However, because the higher VDSL frequency signals attenuate faster on twisted copper pairs ("twisted pairs" or "loops"), VDSL loops are relatively shorter to meet the bandwidth requirements for "triple play" (combined IPTV, VoIP and internet data), say, 20-30 or 50 Mbps downstream. For this reason, VDSL is primarily fed from a DSLAM adjacent a SAI which is usually less than 5 Kft from an end user client device such as a gateway or set top box at customer premises, as shown in FIG. 1. In contrast, other DSL techniques such as ADSL designs are primarily intended for use from the central office of a telephone company to customer premises. The distance between central offices to customer premises may be as long as 22 Kft for ADSL designs.

Lab testing has shown that the VDSL technique is capable of providing a bandwidth of 20 Mbps downstream and 1 Mbps upstream on a 26-gauge loop of 4000 ft. In one hypothetical scenario, 80 percent of IPTV or triple-play residential customers are inside the range of 4000 ft from an IPTV or triple-play network node. In the context of the present disclosure the IPTV or triple-play network node is a DSL access multiplexer (DSLAM) adjacent to a SAI. Hence, assuming 20 Mbit/sec (Mbps) down stream/1 Mbps up stream bit rate is an appropriate bandwidth demand for providing triple play service, a triple-play service provider could theoretically serve about 80% of its customers. This simple analysis of the hypothetical yields promising results, however, in reality may be insufficient because VDSL is deployed to provide IPTV service. As IPTV has many attractive features such as "instant channel change" and "video-on-demand" but these features invariably require extra bandwidth to deliver. Moreover, with high definition (HD) TV is becoming more and more popular the bandwidth requirement for IPTV service is also increasing.

Taking all these factors into account, the actual triple-play bandwidth requirement is estimated to be 30 Mbps down stream and 2 Mbps up stream. To meet this bandwidth demand of 30 Mbps down stream and 2 Mbps up stream, the VDSL reach (loop run length to the customer from the SAI) could be shortened to about 2.5 Kft, but consequently only 60% of customers can be served from an IPTV or triple-play network node. Moreover, a successful triple play network design including an IPTV network will take into account the temperature factor, the residual bridged tap after grooming, various cable faults and the impact of impulse noise. Based on typical losses in the provision of ADSL service, all these factors will eat up about 20%-30% of the total theoretical bandwidth.

In brief, in the above illustrative scenario, the number of VDSL subscribers who can actually enjoy VDSL service will be less than the theoretical estimation of 80%. It is therefore highly desirable for VDSL triple-play service providers to extend the VDSL data rate/reach to serve more customers. Some techniques have been proposed accordingly, such as wire bonding. However, wire bonding is still not considered to be as mature a technique as desired. Moreover, using multiple pairs for a VDSL customer increases the possibility of line fault and trouble ticket. The illustrative embodiment provides another method to extend VDSL rate/reach and serve more customers with VDSL. Moreover, the disclosed illustrative embodiment is simpler and more reliable than wire bonding.

In an illustrative embodiment, a particular illustrative IPTV or triple-play VDSL repeater provides two modes: a repeat mode (signal amplification mode) and bypass mode (signal pass through mode) in the upstream and downstream directions. When an illustrative VDSL repeater is powered by a DC power supply from the DSLAM at the SAI, the illustrative VDSL repeater works in the repeat mode, amplifying an IPTV (or triple play) VDSL signal in both downstream and upstream directions and increasing the IPTV (or triple play) VDSL bit rate per second and extending the VDSL reach to additional customers associated with a particular SAI and/or DSLAM. When there is no power supply at the SAI, the VDSL repeater senses that there is no power supply voltage (−48V or whatever power supply voltage is supplied as standard or desired in a network utilizing an illustrative embodiment) provided and automatically assumes the bypass mode.

In the bypass mode, the VDSL repeater is bypassed and becomes transparent to whatever signal is on the VDSL line or triple-play VDSL line (also referred to as a "twisted pair" or "loop"). The bypass mode is desirable when the same loop is to be used for other non-VDSL (or xDSL in another embodiment) service or when technicians want test the loop with any existing test equipments such as copper loop tester, DSL tester, etc.

As shown in FIG. 1 a central office 104 is contained within a plant 102. The plant is part of the infrastructure of the triple-play network, including an IPTV, VoIP and internet service provider (ISP) network. The central office sends a data signal through feeder cable 106 to a service area interface 110. A DSLAM 108 converts the input signal from the fiber optic feeder cable 105 into a digital signal line signal and delivers it over distribution cable twisted pair 112 to customer premises 118 to a VDSL modem 114.

Figure 2:
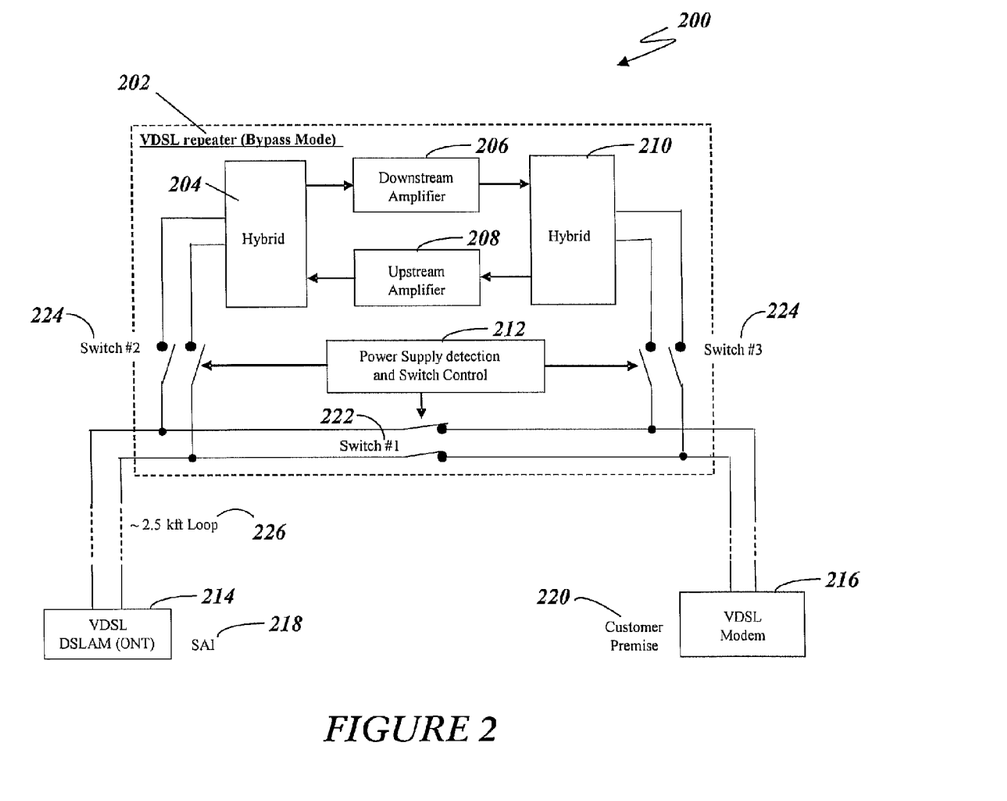
FIG. 2 depicts an illustrative embodiment of an VDSL repeater in bypass mode.

FIG. 2 shows a VDSL repeater 200 in the bypass mode. The switch 1 222 is a "normally closed" relay and switch 2 224 and 3 224 are "normally open" relays. When no voltage is present, the switches assume their normal mode (switch 1 222 closed and switches 2 224 and 3 224 open) and the repeater is bypassed (in the bypass mode). As clearly shown in FIG. 2, VDSL repeater in this bypass mode has no effect on whatever electrical signal on the loop. Thus the electrical signal from on loop 227 from VDSL DSLAM 214 and SAI 218 is passed through the repeater unaltered in the bypass mode to VDSL modem 216 at customer premise 220.

Figure 3:
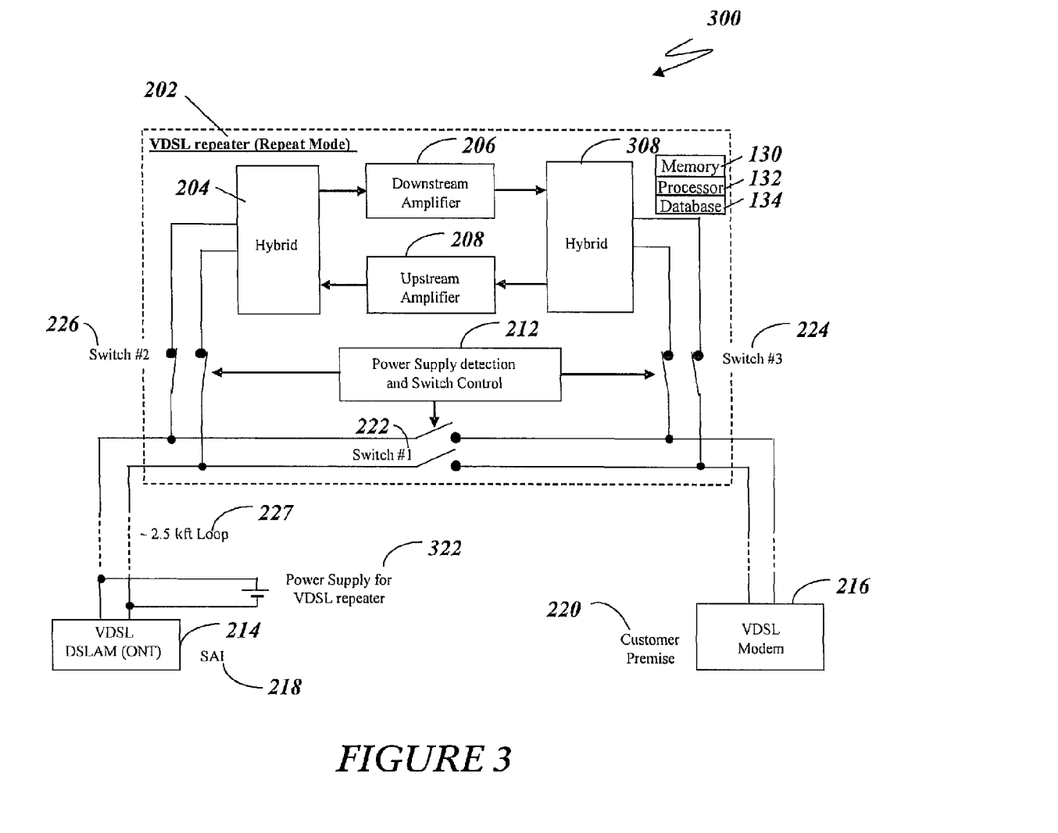
FIG. 3 depicts an illustrative embodiment of an VDSL repeater in repeat mode.

As shown in FIG. 3, when the VDSL repeater detects DC power supply voltage 322 from the DSLAM and verifies that it is able to feed sufficient current to the repeater amplifier 206 or 208, the repeater 300 enters the repeat mode (amplification mode) by opening the switch 1 222 and closing switch 2 226 and 3 224. In the repeat mode, the VDSL repeater 202 uses hybrid units 204, 210 to separate downstream and upstream signals so that both can be independently amplified, then it uses another hybrid to combine the downstream and upstream signals and put them back on the xDSL loop. All the components mentioned above are commonly used in VDSL Modem, which implies they are immediately available at low cost.

Referring still to FIG. 3, a VDSL loop is usually between 1-5 Kft long, in an illustrative embodiment, an VDSL repeater is connected vice loop 227, 2.5 Kft from an ITPV node VDSL DSLAM (as shown in FIG. 3). An illustrative VDSL repeater is able to amplify the downstream IPTV 30-50 Mbps signals to restore the attenuated signal back to the level that it was when exiting the VDSL DSLAM 214. Therefore, the effect of the illustrative VDSL repeater to a VDSL modem is like moving the VDSL DSLAM to the position of repeater. Thus, VDSL modem can sync up with DSLAM at a downstream rate of 30-50 Mbps even when the total loop (distance from the CO to the customer) is 5 Kft (without repeater the down stream bit rate is limited to about 15 Mbps). Similar analysis can be applied to an upstream signal, which is why the upstream rate can be enhanced to 3 Mbps on a 5 Kft loop, while it is limited to approximately 1 Mbps without VDSL repeater.

Figure 4:
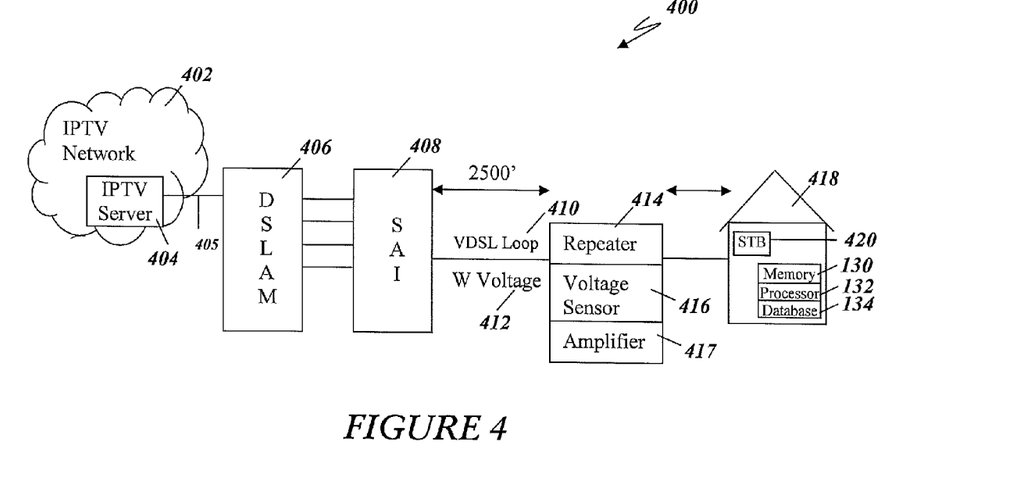
FIG. 4 depicts an IPTV network server delivering data to an IPTV network node and a VDSL repeater to an end user client device.

Turning now to FIG. 4, in a particular illustrative embodiment an IPTV network 402 includes an IPTV server 404 that sends a data signal over line 405 to the DSLAM 406. The DSLAM sends the VDSL signal to a SAI 408. The SAI 408 sends the VDSL signal to the repeater 414. The repeater includes a voltage sensor 416 to determine when a power supply voltage is present on the VDSL line 412. The repeater amplifies the signal on the VDSL line using amplifier 417 and sends the amplified signal on to the STB 420 at residence 418. STB 420 includes a processor 130 coupled to a memory 132. The memory includes a data base 134.

Figure 5:
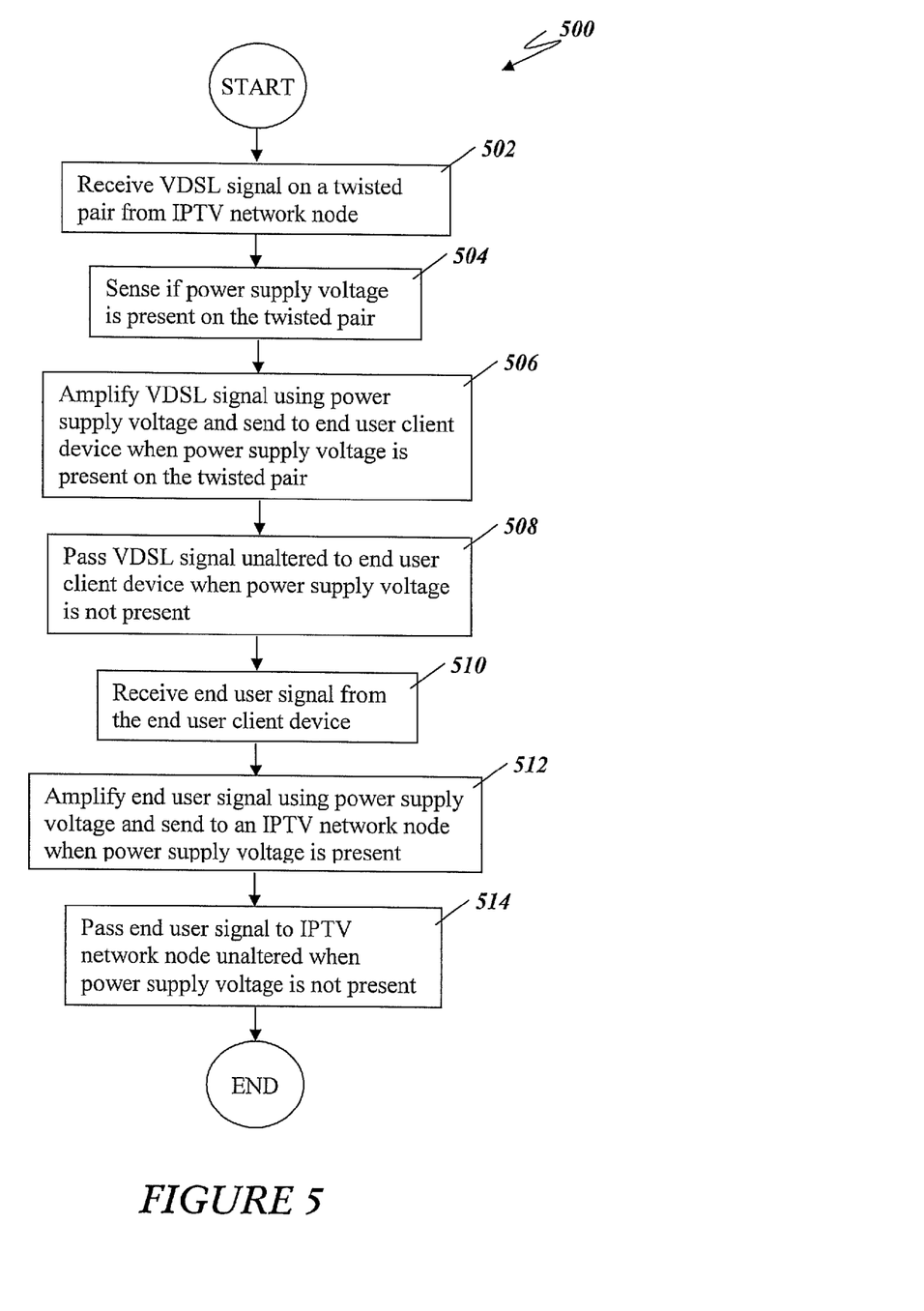
FIG. 5 depicts a flowchart of functions performed in an illustrative embodiment.

Turning now to FIG. 5, a flow chart of operations is performed in an illustrative embodiment is disclosed. At block 502 a VDSL signal is received on a twisted pair from the IPTV network node. At block 504 a power supply voltage is sensed to determine when the power supply voltage is present on the twisted pair. At block 506 the VDSL signal is amplified using the power supply voltage and the amplified VDSL signal is sent to an end user client device when the power supply voltage is present on the twisted pair. At block 508 the VDSL signal is passed unaltered to an end user client device when the power supply voltage is not present. At block 510 an end user signal is received from the end user client device. At block 512 the end user signal is amplified using the power supply voltage and the amplified end user signal is sent to an IPTV network node when the power supply voltage is present on the twisted pair. At block 514 the end user signal is passed to the IPTV network node unaltered when the power supply voltage is not present on the twisted pair.

Figure 6:
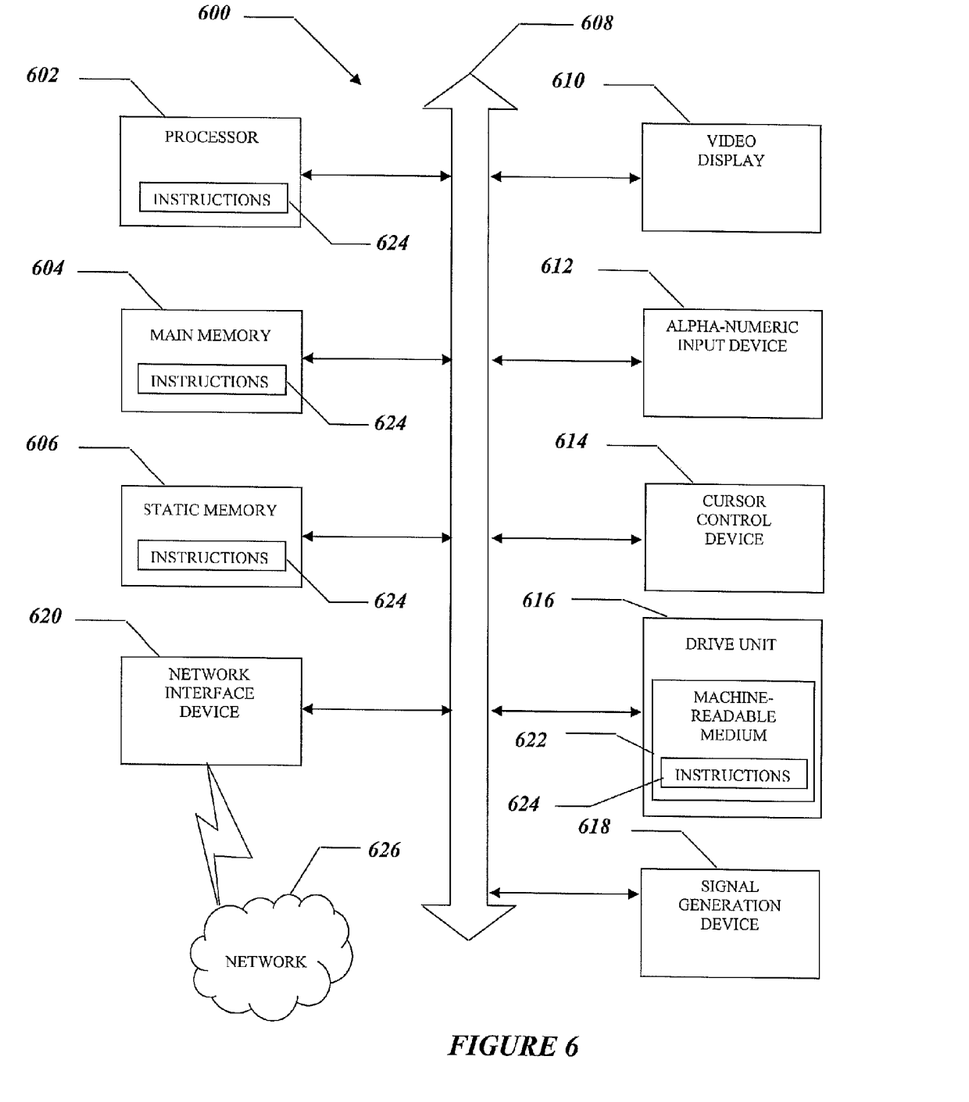
FIG. 6 is an illustrative embodiment of a machine for performing functions disclosed.

FIG. 6 is a diagrammatic representation of a machine in the form of a computer system 600 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU), or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated in herein above. The instructions 624 may also reside, completely or at least partially, within the main memory 604, the static memory 606, and/or within the processor 602 during execution thereof by the computer system 600. The main memory 604 and the processor 602 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

In another illustrative embodiment a user can select a video or audio stream to be sent to an external audio or video device outside of the home via the IPTV network. In another illustrative embodiment a user can receive a video or audio from the house from a remote receiver or IP device and/or establish video or audio communication between the remote location and the audio and/or video devices in the home. In another illustrative embodiment motion detection on a camera sends alert to an STB of viewers with who a viewer wishes to communicate, alternatively email/SMS to additional device. In another illustrative embodiment, with management of available viewers at STBs and a buddy list to set up video sessions or audio with friends and neighbors. In another illustrative embodiment peer to peer video distribution "live broadcast" is provided.

In another illustrative embodiment a method for monitoring home remotely or controlling appliances in home via IPTV interface/portal is provided. Technologies to use are Zigbee, X10, or RF remotes.

In another illustrative embodiment, IP-TV user interface is provided for that contains easy wizards to (1) identify Zigbee and RFID supported devices dynamically and incorporate functionality into the control interface, (2) let user set up X10 control codes for various appliances based on what she has configured in her home, (3) include smart remote capability to let user define other audio and/or video equipment in the home and where it is, so RF can be used to control other devices (and in this case the "closest" STB could be used to transfer the RF signals when it is with the other audio and/or video equipment to be controlled).

It should be noted that while the preferred embodiment of this video distribution architecture utilizes a FTTN or FTTH broadband network for IPTV delivery, it could similarly be implemented to work on alternative access networks including digital cable networks, satellite television systems, terrestrial wireless delivery networks (e.g. WiMAX) as bandwidth improves, or even 3G and 4G wireless networks using wireless handsets as the video authoring station.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for sending data over very high bit rate digital subscriber line, comprising:
   receiving a very high bit rate digital service line signal on a twisted pair from an internet protocol television network node, wherein the very high bit rate digital service line signal further comprises an upstream signal portion and an downstream signal portion; and
   separately amplifying each of the upstream signal portion and the downstream signal portion of the very high bit rate digital service line signal when the power supply voltage is present with the very high bit rate digital service line signal on the twisted pair and bypassing the amplifying each of the each of the upstream signal portion and the downstream signal portion of the very high bit rate digital service line signal when the power supply voltage is not present on the very high bit rate digital service line.

2. The method of claim 1, wherein the data is video data.

3. The method of claim 1, wherein the data is internet protocol television data.

4. The method of claim 1, further comprising:
   sending the amplified very high bit rate digital service line signal to an end user client device when the power supply voltage is present with the very high bit rate digital service line signal on the twisted pair.

5. The method of claim 1, further comprising:
   passing the very high bit rate digital service line signal unaltered to an end user client device when the power supply voltage is not present with the very high bit rate digital service line signal on the twisted pair.

6. The method of claim 1, further comprising:
   receiving an end user signal from an end user client device;
   amplifying the end user signal using the power supply voltage and sending the amplified end user signal to an internet protocol television network node when the power supply voltage is present with the very high bit rate digital service line signal on the twisted pair; and
   passing the end user signal to the internet protocol television network node unaltered when the power supply voltage is not present with the very high bit rate digital service line signal on the twisted pair.

7. The method of claim 1, wherein the power supply voltage is −48 volts.

8. The method of claim 1, wherein the internet protocol television network node receives the internet protocol television signal over an optical fiber from a central office in an internet protocol television network.

9. The method of claim 1, wherein the internet protocol television network node is selected from the group consisting of a service area interface and a digital subscriber line aggregator multiplexer.

10. A tangible non-transitory computer readable medium containing a computer program comprising computer executable instructions for execution by a processor that perform functions that are useful in sending an internet protocol television over very high bit rate digital service line signal, the computer program comprising:
    instructions to receive a very high bit rate digital service line signal on a twisted pair from an internet protocol network node, wherein the very high bit rate digital service line signal further comprises an upstream signal portion and an downstream signal portion;
    instructions to determine whether a power supply voltage is present with the very high bit rate digital service line signal on the twisted pair; and
    instructions to, amplify the upstream signal portion and the downstream signal portion of the very high bit rate digital service line signal using the power supply voltage when the power supply voltage is present with the very high bit rate digital service line signal on the twisted pair and when the power supply voltage is not present on the twisted pair, bypass the amplifying the upstream signal portion and the downstream signal portion of the very high bit rate digital service line signal.

11. The medium of claim 10, the computer program further comprising:
    instructions to send the amplified very high bit rate digital service line signal to an end user client device when the power supply voltage is present with the very high bit rate digital service line signal on the twisted pair.

12. The medium of claim 10, the computer program further comprising:
    instructions to pass the very high bit rate digital service line signal unaltered to an end user client device when the power supply voltage is not present with the very high bit rate digital service line signal on the twisted pair.

13. The medium of claim 10, the computer program further comprising:
    instructions to receive an end user signal from the end user client device;
    instructions to amplify the end user signal using the power supply voltage and sending the amplified end user signal to an internet protocol television network node when the power supply voltage is present with the very high bit rate digital service line signal; and
    instructions to pass the end user signal to the IPTV network node unaltered when the power supply voltage is not present.

14. A very high bit rate digital service line repeater comprising:
    a first interface for receiving the very high bit rate digital service line signal on a twisted pair from an internet protocol television network node, wherein the very high bit rate digital service line signal further comprises an upstream signal portion and an downstream signal portion;
    a second interface for determining when a power supply voltage and sufficient current are present with each of the very high bit rate digital service line upstream signal and downstream signal on the twisted pair; and
    a third interface for separately amplifying the upstream signal portion and the downstream signal portion of the very high bit rate digital service line signal using the power supply voltage when the power supply voltage is present with the very high bit rate digital service line signal on the twisted pair and when the power supply voltage is not present on the twisted pair, a fourth interface for bypassing the amplifying the each of the upstream signal portion and the downstream signal portion of the very high bit rate digital service line signal.

15. The very high bit rate digital service line repeater of claim 14, further comprising:
a circuit that bypasses the amplifier when the power supply voltage is not present on the first interface.

16. The very high bit rate digital service line repeater of claim 15, wherein the first interface is also for sending data to the internet protocol television network node and the second interface is also for receiving data from the end user client device, the very high bit rate digital service line repeater further comprising:
a first hybrid circuit positioned between the first interface and the amplifier that connects down stream data from the first interface to a down stream amplifier and a second hybrid circuit positioned between the second interface and the amplifier that connects upstream data received on the second interface to an upstream amplifier, wherein the amplified upstream data is sent to the first interface and the amplified downstream data is sent to the second interface.

17. A system for distributing internet protocol television data from an internet protocol television network comprising:
an internet protocol television network node in the internet protocol television network;
a first interface for receiving a very high bit rate digital service line signal on a twisted pair from an internet protocol network node, wherein the very high bit rate digital service line signal further comprises an upstream signal portion and an downstream signal portion;
a second interface for determining whether a power supply voltage is present with the very high bit rate digital service line signal on the twisted pair;
and
a third interface for separately amplifying each of the upstream signal portion and the downstream signal portion of the very high bit rate digital service line signal using the power supply voltage when the power supply voltage is present on the twisted pair, a fourth interface for bypassing the amplifying each of the each of the upstream signal portion and the downstream signal portion of the very high bit rate digital service line signal when the power supply voltage is not present on the twisted pair.

18. The system of claim 17, further comprising:
a bypass circuit that directly connects the first interface to the second interface and bypasses the amplifier when the power supply voltage is not present on the twisted pair.

19. The very high bit rate digital service line repeater of claim 17, wherein the first interface sends data to the internet protocol television node and receives data from the end user client device the second interface, the very high bit rate digital service line further comprising:
a first hybrid circuit positioned between the first interface and the amplifier that connects down stream data from the first interface to a down stream amplifier and a second hybrid circuit positioned between the second interface and the amplifier that connects upstream data from the end user client device to an upstream amplifier, wherein the amplified upstream data is sent to the internet protocol television node and the amplified downstream data is sent to the end user client device.

20. A method for amplifying an internet protocol television very high speed digital service line signal, comprising:
receiving the very high bit rate digital service line signal on a twisted pair from an internet protocol network node, wherein the very high bit rate digital service line signal further comprises an upstream signal portion and an downstream signal portion;
determining whether a power supply signal voltage is present with the very high bit rate digital service line signal on the twisted pair;
and
when the power supply voltage is not present on the twisted pair, separately amplifying each of the upstream signal portion and the downstream signal portion of the very high bit rate digital service line signal using the power supply voltage when the power supply voltage is present with the very high bit rate digital service line signal on the twisted pair and when the power supply voltage is not present on the twisted pair, bypassing the amplifying each of the each of the upstream signal portion and the downstream signal portion of the very high bit rate digital service line signal.

21. The method of claim 20, further comprising:
sending the amplified very high bit rate digital service line signal when the power supply voltage is present with the very high bit rate digital service line signal on the twisted pair.

22. The method of claim 20, further comprising:
passing the very high bit rate digital service line signal unaltered when the power supply voltage is not present with the very high bit rate digital service line signal on the twisted pair.

23. The method of claim 20, further comprising:
receiving an end user signal;
amplifying the end user signal using the power supply voltage and sending the amplified end user signal when the power supply voltage is present with the very high bit rate digital service line signal on the twisted pair; and
passing the end user signal unaltered when the power supply voltage is not present with the very high bit rate digital service line signal on the twisted pair.

* * * * *